(12) United States Patent
Fawaz et al.

(10) Patent No.: US 10,587,360 B2
(45) Date of Patent: Mar. 10, 2020

(54) DEVICE PRIVACY PROTECTION

(71) Applicant: Hewlett Packard Enterprise Development LP, Houston, TX (US)

(72) Inventors: Kassem Fawaz, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/080,155

(22) PCT Filed: Feb. 26, 2016

(86) PCT No.: PCT/US2016/019792
§ 371 (c)(1),
(2) Date: Aug. 27, 2018

(87) PCT Pub. No.: WO2017/146727
PCT Pub. Date: Aug. 31, 2017

(65) Prior Publication Data
US 2019/0020439 A1   Jan. 17, 2019

(51) Int. Cl.
*H04K 3/00* (2006.01)
*H04W 4/06* (2009.01)
*H04W 12/02* (2009.01)
*H04L 29/06* (2006.01)
(Continued)

(52) U.S. Cl.
CPC ............. *H04K 3/825* (2013.01); *H04K 3/41* (2013.01); *H04K 3/45* (2013.01); *H04K 3/65* (2013.01); *H04L 63/18* (2013.01); *H04W 4/00* (2013.01); *H04W 4/06* (2013.01); *H04W 12/02* (2013.01);
(Continued)

(58) Field of Classification Search
CPC ............ H04K 3/825; H04K 3/45; H04K 3/41; H04K 3/65; H04K 3/28; H04K 2203/18; H04W 4/00; H04W 12/02; H04W 4/06; H04W 4/80; H04L 63/18
See application file for complete search history.

(56) References Cited

U.S. PATENT DOCUMENTS

| 6,222,458 B1 | 4/2001 | Harris |
| 7,221,900 B2 | 5/2007 | Reade et al. |
| 2004/0100359 A1 | 5/2004 | Reade et al. |

(Continued)

FOREIGN PATENT DOCUMENTS

| WO | 2010/135085 A1 | 11/2010 |
| WO | 2012/044693 A1 | 4/2012 |

(Continued)

OTHER PUBLICATIONS

Andrew Leonard, "Wearable Honeypot," Ph.D. dissertation, Worcester Polytechnic Institute, Apr. 30, 2015, 64 pages.
(Continued)

*Primary Examiner* — Shaima Q Aminzay
(74) *Attorney, Agent, or Firm* — Hewlett Packard Enterprise Patent Department

(57) ABSTRACT

Example implementations relate to advertisements of a privacy protected device. For example, advertisements of the privacy protected device are jammed. Additionally dummy device advertisements are broadcasted. The dummy device advertisements include a reduced-information advertisement for the privacy protected device.

20 Claims, 8 Drawing Sheets

(51) Int. Cl.
*H04W 4/00* (2018.01)
*H04W 4/80* (2018.01)

(52) U.S. Cl.
CPC ........... *H04K 3/28* (2013.01); *H04K 2203/18* (2013.01); *H04W 4/80* (2018.02)

(56) References Cited

U.S. PATENT DOCUMENTS

| | | | |
|---|---|---|---|
| 2005/0197164 A1* | 9/2005 | Chan | G06Q 30/02 455/566 |
| 2007/0293197 A1 | 12/2007 | Ekberg et al. | |
| 2008/0298587 A1 | 12/2008 | Luk et al. | |
| 2014/0099913 A1 | 4/2014 | Zellner et al. | |
| 2014/0118116 A1 | 5/2014 | Lavedas | |
| 2014/0158768 A1 | 6/2014 | Ray et al. | |
| 2015/0031335 A1 | 1/2015 | Dong et al. | |
| 2015/0118996 A1 | 4/2015 | Shaw | |

FOREIGN PATENT DOCUMENTS

| | | | |
|---|---|---|---|
| WO | 2013/176439 A1 | 11/2013 | |
| WO | WO-2014175721 A1 | 10/2014 | |
| WO | WO-2015072899 A1 | 5/2015 | |

OTHER PUBLICATIONS

European Search Report and Search Opinion Received for EP Application No. 16891839.9, dated Jun. 25, 2019, 8 pages.

Federal Trade Commission, "Internet of Things, Privacy & Security in a Connected World,", Jan. 2015, 71 pages.

Gollakota et al., "They can hear your heartbeats: Non-invasive security for implantable medical devices", in Proceedings of the ACM SIGCOMM 2011 Conference, ser. SIGCOMM '11. New York, NY, USA: ACM, 2011, pp. 2-13.

H. Park, C. Basaran, T. Park, and S. H. Son, "Energy-efficient privacy protection for smart home environments using behavioral semantics," Sensors, vol. 14, No. 9, pp. 16235-16257, 2014.

International Search Report and Written Opinion received for PCT Patent Application No. PCT/US2016/019792, dated Nov. 17, 2016, 7 pages.

Mare et al., "Hide-n-sense: Preserving privacy efficiently in wireless mhealth," Mobile Networks and Applications, vol. 19, No. 3, pp. 331-344, 2014.

Ping Wang, "Bluetooth low energy-privacy enhancement for advertisement," 2014., 93 pages.

Srinivasan et al, "Protecting your daily in-home activity information from a wireless snooping attack," in Proceedings of the 10th International Conference on Ubiquitous Computing, ser. UbiComp '08. New York, NY, USA: ACM, 2008, pp. 202-211.

Ziegeldorf et al., "Privacy in the internet of things: threats and challenges," Security and Communication Networks, vol. 7, No. 12, pp. 2728-2742, 2014.

Mary R. Schurgot et al., "Experiments with Security and Privacy in IoT Networks," Jun. 14-17, 2015, pp. 1-6, IEEE.

* cited by examiner

DEVICE PRIVACY PROTECTION

BACKGROUND

Devices may be equipped with sensors, actuators, electronics, software, and electronic communication technology. Such devices may collect data and may also exchange data with each other, with computing platforms, and/or with the Internet (e.g., a cloud-based platform, or more generally, the cloud). The device may broadcast electronic advertisements to announce its presence in order for a gateway to connect with it. Advertisements may contain data that identifies the device or a user of the device.

BRIEF DESCRIPTION OF THE DRAWINGS

Various examples will be described below with reference to the following figures.

DETAILED DESCRIPTION

Figure 1:
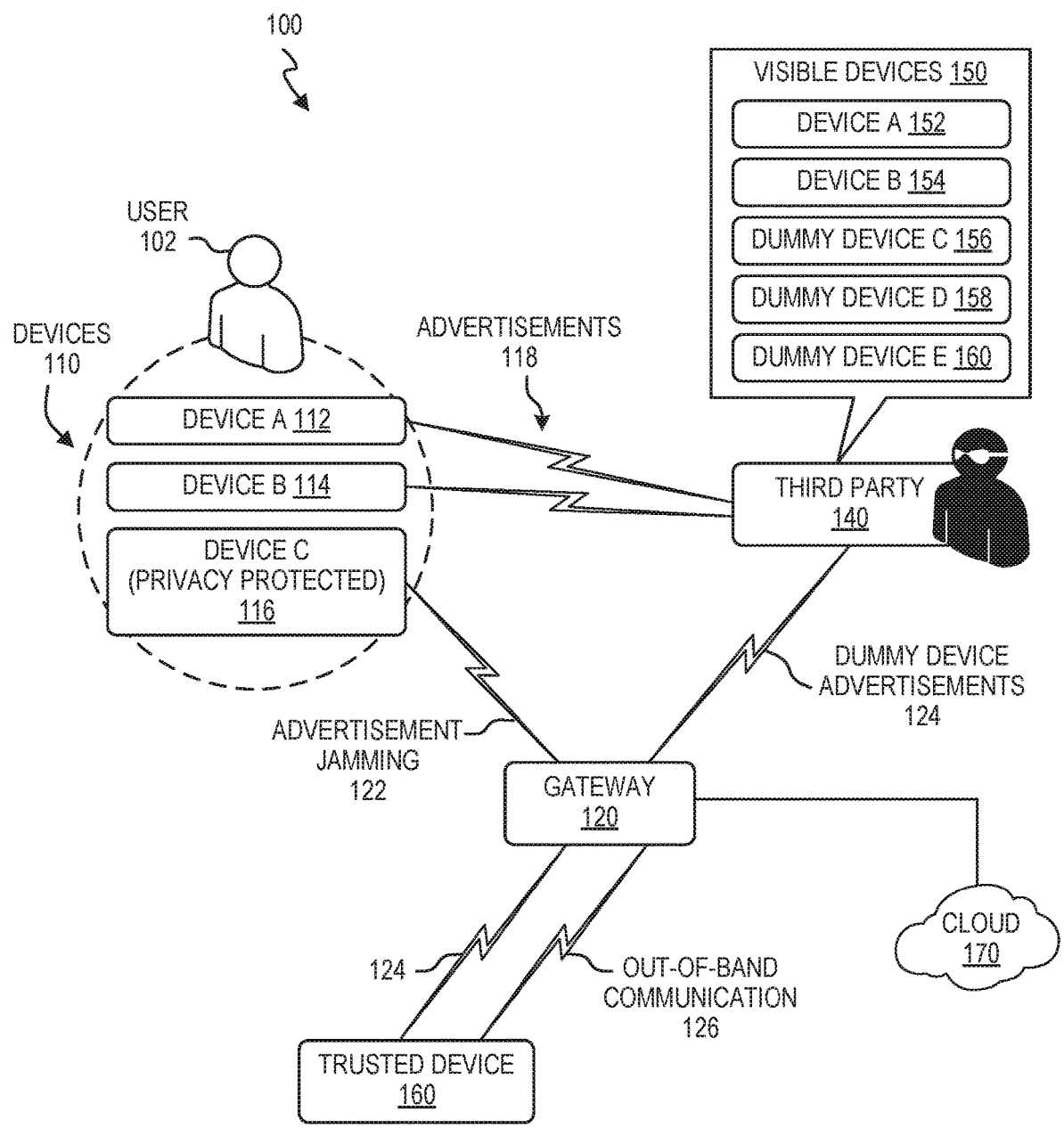
FIG. 1 depicts an example environment in which device privacy protection may be employed, according to an implementation.

Devices may be equipped with sensors, actuators, electronics, software, and electronic communication technology. Such devices may collect data and may also exchange data with each other, with computing platforms, and/or with the Internet (e.g., a cloud-based platform, or more generally, the cloud). Additionally, such devices may take the form of various objects, such as wearable devices, healthcare devices, vehicles, media devices, home automation devices, or appliances. This paradigm of interconnected devices may be referred to as the "Internet-of-Things" (IoT).

IoT devices may communicate with each other and with gateway devices by wireless communication technology, such as Bluetooth Low Energy (BLE), Bluetooth, Wi-Fi, ZigBee, near field communication, etc. Gateway devices, or "gateways", may include computers, smartphones, tablets, networking access points, or other electronic devices, and may act as a link between the IoT device and a user or between the IoT device and the cloud. For example, a user may utilize a gateway (e.g., a smartphone) to view data collected by an IoT device (e.g., a fitness tracker worn by the user). In another example, a gateway device (e.g., a smartphone or a networking access point) may collect data from an IoT device (e.g., a fitness tracker) and transmit the data to the cloud, for storage and/or analysis.

The IoT device may advertise its presence in order for a gateway to connect with it. For example, the BLE protocol defines the types of advertisements to broadcast, how often advertisements are to be broadcast, and three advertising channels over which the advertisements are to be broadcast. Generally, an advertisement may be packet(s) of data that contain an address of the IoT device, along with other information, such as the IoT device's name, class or type, and offered services. A gateway can scan for these advertisements and initiate a connection to the advertising IoT device. However, advertisements reveal the IoT device's presence and may leak the aforementioned information, and with such knowledge, a third party observer may profile or identify a user (e.g., based on the type of devices carried), monitor a user's behavior, access or infer sensitive information, or attack the device (e.g., denial of service attacks).

More particularly, a user may be profiled from advertisement information in terms of health situation (e.g., presence of a glucose monitor may imply a diabetic condition), lifestyle (e.g., based on a presence of fitness trackers), preferences (e.g., based on brands of devices), personal interests (e.g., based on class of devices, such as toys, cameras, pet activity trackers, etc.), fingerprint of a home security system or security cameras, or user behavior (e.g., based on sensory values from a smart home environment).

Example techniques of the present disclosure may relate to jamming advertisements broadcasted by a privacy protected device and broadcasting dummy device advertisements, which include a reduced-information advertisement for the privacy protected device. By virtue of the foregoing, the systems and techniques of the present disclosure may be useful for hiding the privacy protected device from third party observers while allowing legitimate or trusted devices to discover the privacy protected device.

Referring now to the figures, FIG. 1 depicts an example environment 100 in which device privacy protection may be employed. A user 102 may possess or operate at least one device. In the example illustrated in FIG. 1, the user 102 possesses a device A 112, a device B 114, and a device C 116 (referred to generally or collectively as a device or devices 110). The devices 110 may have a combination of communication technology, sensor and/or actuator capabilities, and hardware and/or software (e.g., machine readable instructions), and may be analogous to IoT devices discussed above. Examples of devices 110 may include wearable devices, healthcare devices, home automation or security devices, etc.

In some implementations, the devices 110 may communicate electronically with other devices (including e.g., gateway 120 and trusted device 160 to be described below) via wireless communication technology, such as Bluetooth, Bluetooth Low Energy (BLE), Wi-Fi, ZigBee, near field communication, etc. In particular, examples that follow may describe an implementation utilizing BLE, although the systems and techniques of the present disclosure may be applicable to other wireless communication technologies.

Devices 110 may send sensor data to, receive inputs or commands from, or otherwise interact with other devices (e.g., a computer, a smartphone, a tablet, the cloud) via the wireless communication technology. For example, a device 110 may communicate with a gateway 120 to present data to the user 102 (e.g., a computer or a smartphone serving as the gateway 120). Additionally or alternatively, a device 110 may connect through the gateway 120 (e.g., a computer, a smartphone, an access point) to communicate with the cloud 170. The cloud 170 may store and/or analyze data from the device 110, and the user 102 may access the cloud 170 via a web page, an application, or the like, to view the data and any related information.

In order to connect with other devices such as the gateway 120, the devices 110 may advertise their presence by wirelessly broadcasting advertisements. However, as discussed above, a third party 140 may observe and analyze the broadcasted advertisements, for example, by using a sniffer that captures and analyzes broadcasted data. The third party 140 may be untrustworthy or may be malicious (e.g., an adversary or attacker).

In some cases, the user 102 may wish to remain private as to possession of certain ones of devices 110 but not necessarily as to others of devices 110. Which of the devices 110 the user 102 may deem sensitive and thus should be privacy protected may depend on the user's level of risk aversion. For example, device C 116 may be a healthcare or fitness related device, and the user 102 may thus desire privacy protection for device C 116.

The user 102 may configure the gateway 120 to protect the privacy of device C 116. For example, the gateway 120 may include a user interface or may be accessible via a web page, whereby the user 102 may specify which of the devices 110 is to be privacy protected (i.e., device C 116, in the present example). In some implementations, the gateway 120 may be a computer, a smartphone, a tablet, a computing device, a networking access point (e.g., a wireless access point, a router), etc.

Various implementations of the gateway 120 will be described further herein below with respect to FIGS. 2-7. In some implementations, the gateway 120 may protect the privacy of device C 116 by jamming advertisements broadcasted by device C 116 (e.g., by an advertisement jamming signal 122) without affecting advertisements 118 of other devices 112 and 114. By virtue of jamming the advertisements of device C 116, the presence of device C 116 may be effectively hidden.

The gateway 120 also broadcasts dummy device advertisements 124 that include advertisements for dummy devices (that is, fictitious devices made up by the gateway 120) as well as a reduced-information advertisement broadcast on behalf of device C 116, with identifying or sensitive information removed. By virtue of including a reduced-information advertisement for device C among advertisements for dummy device, the third party 140 has a lower certainty of identifying the real device C 116 or class of the device C 116.

For example, the third party 140 may observe visible devices 150 that include device A 152 corresponding to device A 112, and device B 154 corresponding to device B 114), by virtue of the advertisements 118 of those devices not being privacy protected. The third party 140 also observes dummy device C 156, dummy device D 158, and dummy device E 160, based on the dummy device advertisements 124. Dummy device C 156 may be related (via the reduced-information advertisement) to device C 116 while dummy device D 158 and dummy device E 160 are made up by the gateway 120, but the third party 140 may not be able to distinguish those advertised devices because advertisements 124 are all broadcast from the same gateway 120 in similar format and fashion. Accordingly, the presence of privacy protected device C 116 is obfuscated among the dummy devices.

In some cases, the user 102 may trust other devices 160 to communicate with device C 116, such as the user's own devices or devices of trusted partners (e.g., friends, family, a healthcare provider, etc.). For example, a trusted device 160 may be a computer, a smartphone, etc. The trusted device 160 may connect with the gateway 120 over an out-of-band communication 126, such as Wi-Fi or any other different communication channel or technology different from the communication technology associated with the advertisements 118 (e.g., BLE). The gateway 120 can then reveal to the trusted device 160, over the out-of-band communication 126, which of the dummy device advertisements 124 correspond to the real device C 116.

By virtue of the foregoing, the presence of privacy protected devices may be hidden from third party observers while still permitting connection with trusted devices.

Figure 2:
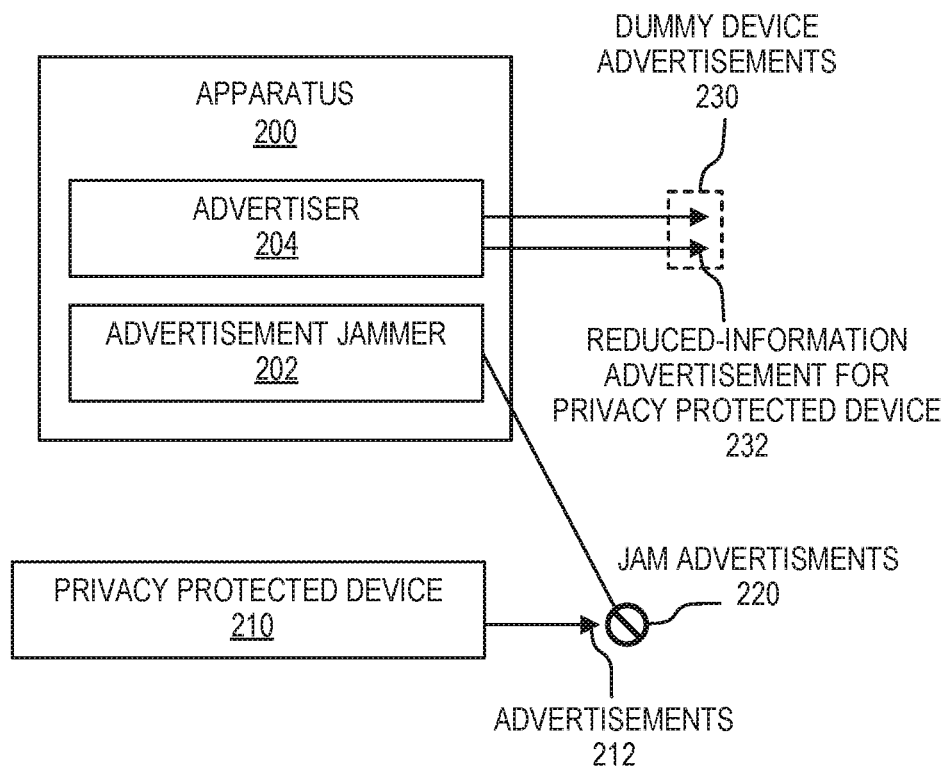
FIG. 2 depicts a block diagram of an example apparatus that includes an advertisement jammer and an advertiser, according to an implementation.

FIG. 2 depicts a block diagram of an example apparatus 200. In some implementations, the apparatus 200 may serve as or form part of the gateway 120 described above. The apparatus 200 may be useful for protecting the privacy of a privacy protected device 210 (also referred to as device 210). The privacy protected device 210 may be an IoT device, and may be similar to the device C 116 described above. The privacy protected device 210 includes communication technology (e.g., including a transceiver) to wirelessly broadcast recurring advertisements 212 to announce its presence and availability for connection with nearby electronic devices and to exchange data with those electronic devices upon successful connection. The apparatus 200 may include the same or compatible communication technology utilized by the privacy protected device 210.

The apparatus 200 includes an advertisement jammer 202 and an advertiser 204, each of which may be any combination of hardware and programming to implement their respective functionalities as described herein. For example, the programming may be executable instructions stored on a non-transitory machine readable medium and the hardware for the components may include a processing resource to retrieve and/or execute those instructions. (The term "non-transitory" does not encompass transitory propagating signals.) For example, the processing resource may be a microcontroller, a microprocessor, central processing unit (CPU) core(s), application-specific integrated circuit (ASIC), a field programmable gate array (FPGA), and/or other hardware device suitable for retrieval and/or execution of instructions from the machine readable medium, and the machine readable medium may be random access memory (RAM), read-only memory (ROM), electrically erasable programmable read-only memory (EEPROM), flash memory, a hard disk drive, etc. Additionally or alternatively, the advertisement jammer 202 and the advertiser 204 may include one or more hardware devices including electronic circuitry or logic for implementing functionality described herein.

The apparatus 200 includes advertisement jammer 202 to jam (220) advertisements 212 broadcasted by the privacy protected device 210. Various jamming techniques may be utilized, and specific implementation details may depend on the communication technology utilized by the privacy protected device 210 to broadcast the advertisements 212. In some implementations, the advertisement jammer 202 may broadcast a jamming signal at a timing that coincides with advertising by the privacy protected device 210. In this manner, the jamming signal may jam, block, mask, corrupt or otherwise interfere with advertisements 212 broadcasted by the privacy protected device 210. Thus, the advertisements 212 may no longer be visible or observable by other electronic devices.

The apparatus 200 also includes an advertiser 204 to broadcast dummy device advertisements 230. The dummy device advertisements 230 are formatted and broadcasted according to the same communication technology that produced the advertisements 212. In some implementations, the advertiser 204 broadcasts the dummy device advertisements 230 and the advertisement jammer 202 broadcasts the jamming signal (e.g. 220) at different times. The dummy device advertisements 230 include advertisements for dummy devices and a reduced-information advertisement 232 on behalf of the privacy protected device 210, which will be described in turn.

The dummy device advertisements 230 include advertisements for dummy devices, that is, fictitious devices devised by the apparatus 200. Although fictitious, the dummy device advertisements 230 may be based on real-world devices (e.g., existing products as registered with an industry group responsible for standardization of the involved communication technology). The advertised dummy devices may fall under device classes (e.g., as defined by the industry group), where such classes may include a wearable device class, a toy device class, a health device class, a phone device class, an imaging device class, etc. In some implementations, the dummy device advertisements may include an advertisement for a dummy device within the same device class as the privacy protected device 210. Additionally or alternatively, the dummy device advertisements may include an advertisement for a dummy device in a different device class than the privacy protected device 210. By virtue of the foregoing, anonymity of the privacy protected device 210 may be preserved within the same device class and across device classes.

In some implementations, the apparatus 200 generates the reduced-information advertisement 232 by capturing an advertisement 212 of the privacy protected device 210 and modifying the advertisement 212 to remove sensitive information (e.g., user name, device name) while maintaining sufficient information to connect with the device 210 (e.g., a device address). By virtue of including the reduced-information advertisement 232 among the dummy device advertisements 230, the presence of the privacy protected device 210 may be hidden among dummy devices, thus frustrating profiling attempts by a third party observer, while still allowing trusted devices to connect with the privacy protected device 210.

Figure 3:
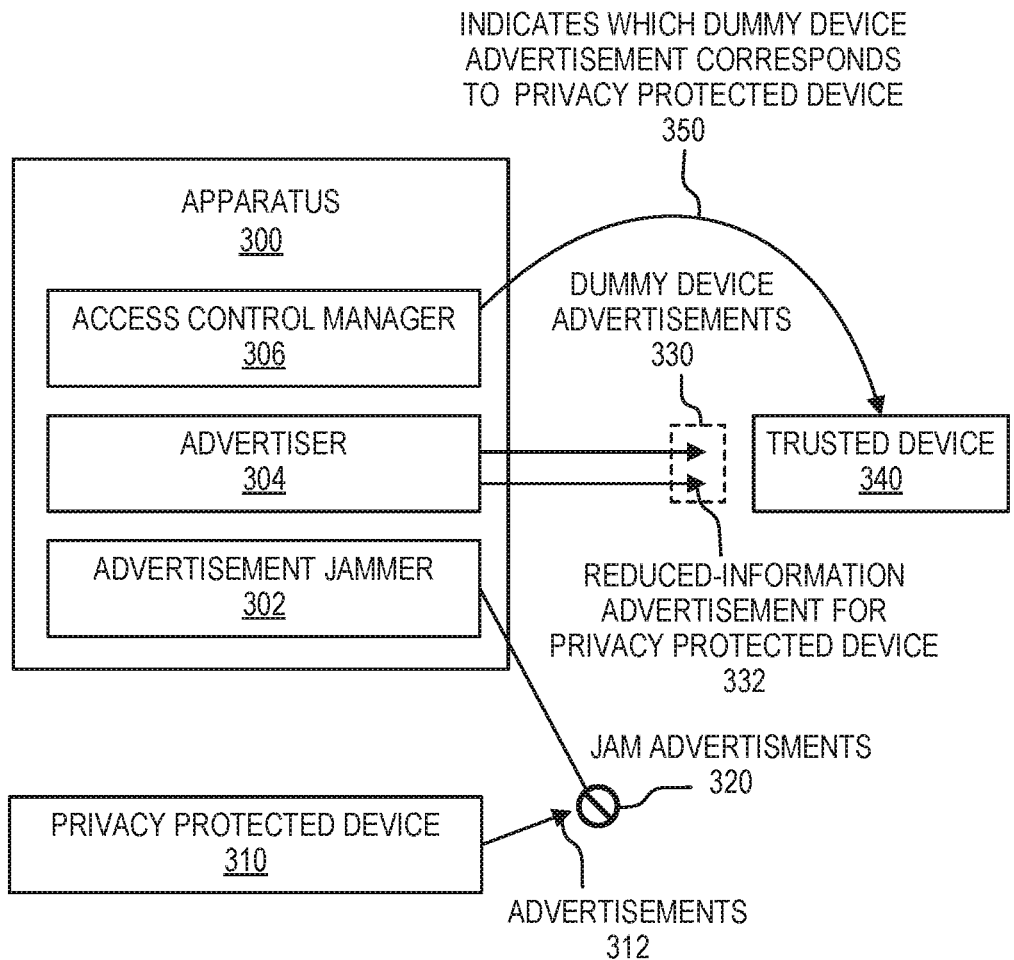
FIG. 3 depicts a block diagram of an example apparatus that includes an advertisement jammer, an advertiser, and an access control manager, according to an implementation.

FIG. 3 depicts a block diagram of an example apparatus 300 for protecting the privacy of a privacy protected device 310 (also referred to as device 310). In some implementations, the apparatus 300 may serve as or form part of the gateway 120 described above. The apparatus 300 includes an advertisement jammer 302, a dummy device advertiser 304, and an access control manager 306, each of which will be described further herein below. The advertisement jammer 302, the advertiser 304, and the access control manager 306 may each be any combination of hardware (e.g., a processing resource, electronic circuitry, logic) and programming (e.g., instructions stored on a non-transitory machine readable medium) to implement their respective functionalities as described herein.

The privacy protected device 310 may be an IoT device, and may be similar to the device C 116 described above. The privacy protected device 310 includes communication technology to wirelessly broadcast recurring advertisements 312 to announce its presence and availability for connection with nearby electronic devices and to exchange data with those electronic devices upon successful connection. The apparatus 300 may include the same or compatible communication technology utilized by the privacy protected device 310. For example, the privacy protected device 310 may broadcast advertisements 312 and exchange data in a manner compatible with or in adherence to the BLE protocol. In such an implementation, the apparatus 300 also may include a BLE (or BLE-compatible) transceiver.

In view of privacy concerns related to advertisements 312, a user of the device 310 may want to protect the privacy of the device 310. The user may configure the apparatus 300 to protect the privacy of device 310, by way of an interface of the apparatus 300. For example, the apparatus 300 may be in the form of a smartphone (or other computing device), in which case the interface may include a touch screen (or other input/output peripheral) to receive configuration data. In another example, the apparatus 300 may be in the form of networking equipment such as an access point, in which case the interface may be a web page or portal provided by the apparatus 300. The user may configure the apparatus 300 by specifying via the interface that the device 310 is to be privacy protected. In some implementations, the apparatus 300 may provide or display a list of detected devices, including device 310 as detected by virtue of advertisements 312, and the user may select device(s) from the list to configure the privacy protection to be provided by the apparatus 300.

The access control manager 306 may maintain (e.g., in storage or memory) a configurable list of privacy protected devices specified via the interface. In some implementations, the apparatus 300 may enter a learning period to learn about characteristics of device 310 and advertisements 312, in response to being configured to protect the privacy of the device 310. Some example aspects of learning by the apparatus 300 will be described further herein below.

With respect to the BLE protocol, advertisements 312 may be broadcast on any of three advertisement channels on the 2.4 GHz spectrum. Advertisements 312 are broadcast by the device 310 at a preset rate determined in the configuration of the device 310. More specifically, advertisements may occur at an interval between 20 milliseconds and 10.24 seconds, at increments of 0.625 milliseconds. Additionally, to avoid advertisements 312 from colliding with advertisements of other devices, the device 310 may wait a random delay between 0 and 10 milliseconds, on top of the advertisement interval, before advertising. Thus, the time between advertisements 312 may vary under the BLE protocol.

The advertisement jammer 302 jams (320) advertisements 312 broadcasted by the privacy protected device 310. In some implementations, the advertisement jammer 302 may broadcast a jamming signal on a wireless advertising channel at a timing to coincide with advertising by the privacy protected device 310 to jam advertisements 312. The jamming signal may be broadcast periodically at an advertising interval (an interval between broadcast of jamming signals), and may be broadcast for a duration referred to as a jamming duration.

In the example implementation utilizing the BLE protocol, the advertisement jammer 302 may generate a jamming signal by commanding the BLE transceiver of the apparatus 300 to continuously transmit over one or more of the three BLE advertisement channels in a window of time. More particularly, the advertisement jammer 302 may issue a Host Controller Interface (HCI) transmission test command (e.g., 0x08 0x01e channel packet_length packet_type) to the BLE transceiver to initiate the continuous jamming transmission, and may issue another HCI command (e.g., 0x08 0x01f) to stop the jamming transmission.

In some implementations, the advertisement jammer 302 may learn the advertisement interval for broadcasting the jamming signal. For example, the advertisement jammer 302 may learn the advertising interval during the aforementioned learning period, or any other time after the learning period (e.g., by user command or by periodically). The learning may be based on multiple advertisements 312 observed by the apparatus 300 during the learning period. The time interval between successive observed advertisements 312 is referred to as an "observed time interval."

The advertisement jammer 302 may learn the advertisement interval as based on a minimum interval from among the observed time intervals. For BLE-based advertisements 312, the advertisement interval may be a minimum interval that is evenly divisible by 0.625 milliseconds, the BLE specification for advertisement interval increment.

As discussed above, BLE-based advertisements 312 may be broadcast after a random delay in a range of 0 to 10 milliseconds. Accordingly, to account for the random delay, the advertisement jammer 302 may broadcast the jamming signal for a long jamming duration of at least 10 milliseconds to cover the full possible range of delay and provide that advertisements 312 are jammed. In some implementations, to account for cumulative uncertainty in when successive advertisements 312 are actually broadcasted owing to the random delay, the jamming duration may be lengthened for each successive jamming signal broadcast. For example, if an advertisement interval is 1000 milliseconds and the jamming duration is 10 milliseconds, a first jamming signal may be broadcast at 0 seconds for 10 milliseconds duration, a second jamming signal may be broadcast at 1000 milliseconds for a 20 millisecond duration, a third jamming signal may be broadcast at 2000 milliseconds for a 30 millisecond duration, a fourth jamming signal may be broadcast at 3000 milliseconds for a 40 millisecond duration, and so forth.

In another implementation, the advertisement jammer 302 may learn the jamming duration (e.g., during the learning period, or any time thereafter), rather than defaulting to a 10 millisecond duration. Learning the jamming duration may be useful if the advertisements 312 are not utilizing the full range of delay (e.g., delays being generally shorter than 10 milliseconds), and thus jamming may be reduced to avoid interference with other transmissions, such as the broadcast of dummy device advertisements which will be described below. The advertisement jammer 302 may base the jamming duration on an empirical distribution (e.g., a histogram, an empirical density function, etc.) of arithmetic differences between the observed time intervals and the learned advertisement interval.

More particularly, the advertisement jammer 302 may select a percentile-rank (e.g., 75th percentile, 80th percentile, 90th percentile, etc.) of the distribution of arithmetic differences as the jamming delay. In this manner, the jamming signal will jam most, if not all, of the randomly varying broadcasts of advertisements 312. The learned jamming duration may also be lengthened for successive broadcasts of the jamming signal, in the manner described above. An example method of learning the advertising interval and the jamming duration will be described below with respect to FIG. 3.

The advertisement jammer 302 may listen for advertisements 312 in some implementations, including during the jamming duration. During active jamming, the advertisements 312 may be completely hidden or may be corrupted. The advertisement jammer 302 may be able to deduce that a corrupted advertisement 312 belongs to the privacy protected device 310, by virtue of contextual information, such as a signal power level associated with the corrupted advertisement 312 or certain identifying information in the corrupted advertisement 312 despite an invalid checksum. A detected advertisement 312, whether corrupted or otherwise, may be used by the advertisement jammer 302 as a new reference point for the jamming timing. The advertisement jammer 302 may broadcast a next jamming signal at an advertisement interval after the detected advertisement 312 and for the original jamming duration (i.e., a default value such as 10 milliseconds or a learned jamming duration).

The advertiser 304 broadcasts dummy device advertisements 330, which may be analogous in many respects to the dummy device advertisements 230. For example, the dummy device advertisements may include advertisements for dummy devices in the same device class and/or different device class than that of the privacy protected device 310. Additionally, the dummy device advertisements 330 include a reduced-information advertisement 332 for the privacy protected device 310, which may be analogous in many respects to the reduced-information advertisement 232 described above. In some implementations, the advertiser 304 may observe advertisements 312 during the aforementioned learning period and may generate the reduced-information advertisement 232 from those learning period advertisements 312 (e.g., by removing sensitive or identifying information).

In implementations where the advertisements 312 and jamming 320 are BLE-based, the dummy device advertisements 330 also are compatible with the BLE protocol. The advertiser 304 may broadcast the dummy device advertisements 330 at a time when the advertisement jammer 302 is not broadcasting a jamming signal (e.g., outside the jamming duration).

The advertiser 304 may use the same data structure to generate the advertisements of the dummy devices and the reduced-information advertisement. The advertiser 304 may compute a schedule for advertising the dummy device advertisements 330. To send the dummy advertisements in a BLE environment, the advertiser 304 may utilize HCI commands to change the address of the BLE transceiver of the apparatus 300, set the advertisement data and scan response to match or simulate the dummy devices, and then broadcast on BLE advertising channels. By virtue of sending using the same logic and hardware (e.g., BLE transceiver) to broadcast advertisements from the apparatus 300, all of the dummy device advertisements 330 (including the reduced-information advertisement 332) will indistinguishably originate from the same hardware, confusing any third party observers.

A user may wish to connect a trusted device 340 to the privacy protected device 310. Although the advertisements 312 are jammed, the advertisement jammer 302 broadcasts the reduced-information advertisement 332 on behalf of the device 310, by which the trusted device 340 may connect to the device 310. However, because the reduced-information advertisement 332 is hidden among the other dummy device advertisements 330 to frustrate profiling by a third party, the trusted device 340 also may not correctly distinguish which dummy device advertisement 330 corresponds to the privacy protected device 310.

To connect the trusted device 340 and the privacy protected device 310, the trusted device 340 may first connect to the apparatus 300 (and in particular, the access control manager 306) over an out-of-band communication link. In some implementations, the trusted device 340 may connect to the apparatus 300 using, for example, a password, a certificate, or other security measure, to confirm its trusted status (i.e., that the user of the privacy protected device 310 approves connection between the privacy protected device 310 and the trusted device 310). The out-of-band communication link may be a communication technology different from the communication technology by which the advertisements 312, 330 are broadcast. For example, in implementations where advertisements 312, 330 are BLE-based, the out-of-band communication link may utilize Wi-Fi.

Once connected, the access control manager 306 indicates (350) to the trusted device 340, over the out-of-band communication link, which of the dummy device advertisements 330 corresponds to the privacy protected device 310. For example, the access control manager 306 may share with the trusted device 340 the device address and/or other information (e.g., device type) included in the reduced-information advertisement 332. The access control manager 306 then schedules a future window of time to temporarily pause the jamming 320 by advertisement jammer 302, so that the trusted device 340 can negotiate a connection with the privacy protected device 310.

Figure 4:
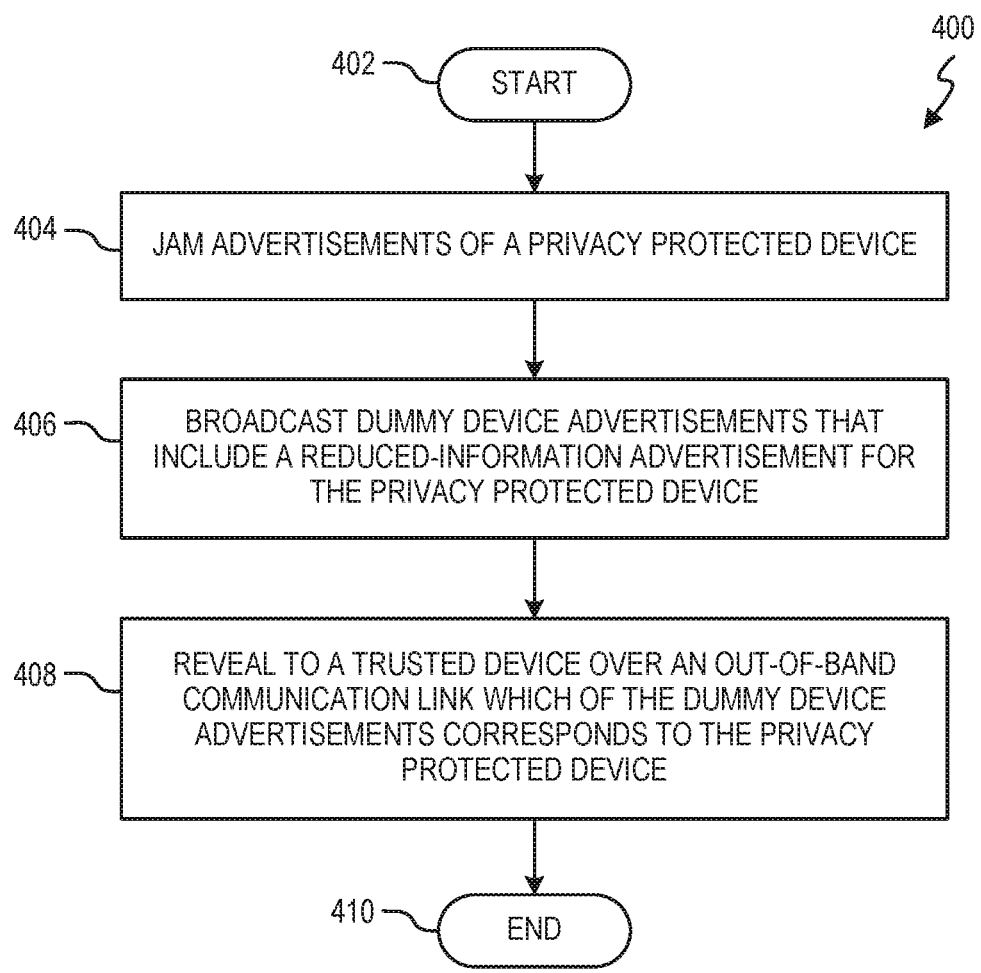
FIG. 4 is a flowchart of an example method for protecting the privacy of a device, according to an implementation.

FIG. 4 is a flowchart of an example method 400 for protecting the privacy of a device, according to an implementation. Method 400 may be implemented in the form of executable instructions stored on a machine readable medium and executed by a processing resource and/or in the form of electronic circuitry. For example, method 400 is described below as being performed by a gateway device, such as the gateway 120 of FIG. 1. Various other devices may perform method 400 as well, such as, for example, the apparatuses 200 or 300 (or gateway 500 or 600 described below). In some implementations of the present disclosure, the blocks of method 400 may be executed substantially concurrently, may be ongoing, and/or may repeat.

The method 400 begins at block 402, and continues to block 404, where a gateway device jams advertisements of a privacy protected device. At block 406, the gateway device broadcasts dummy device advertisements that include a reduced-information advertisement for the privacy protected device. At block 408, the gateway device reveals, to a trusted device over an out-of-band communication link, which of the dummy device advertisements corresponds to the privacy protected device. The method 400 ends at block 410.

Figure 5:
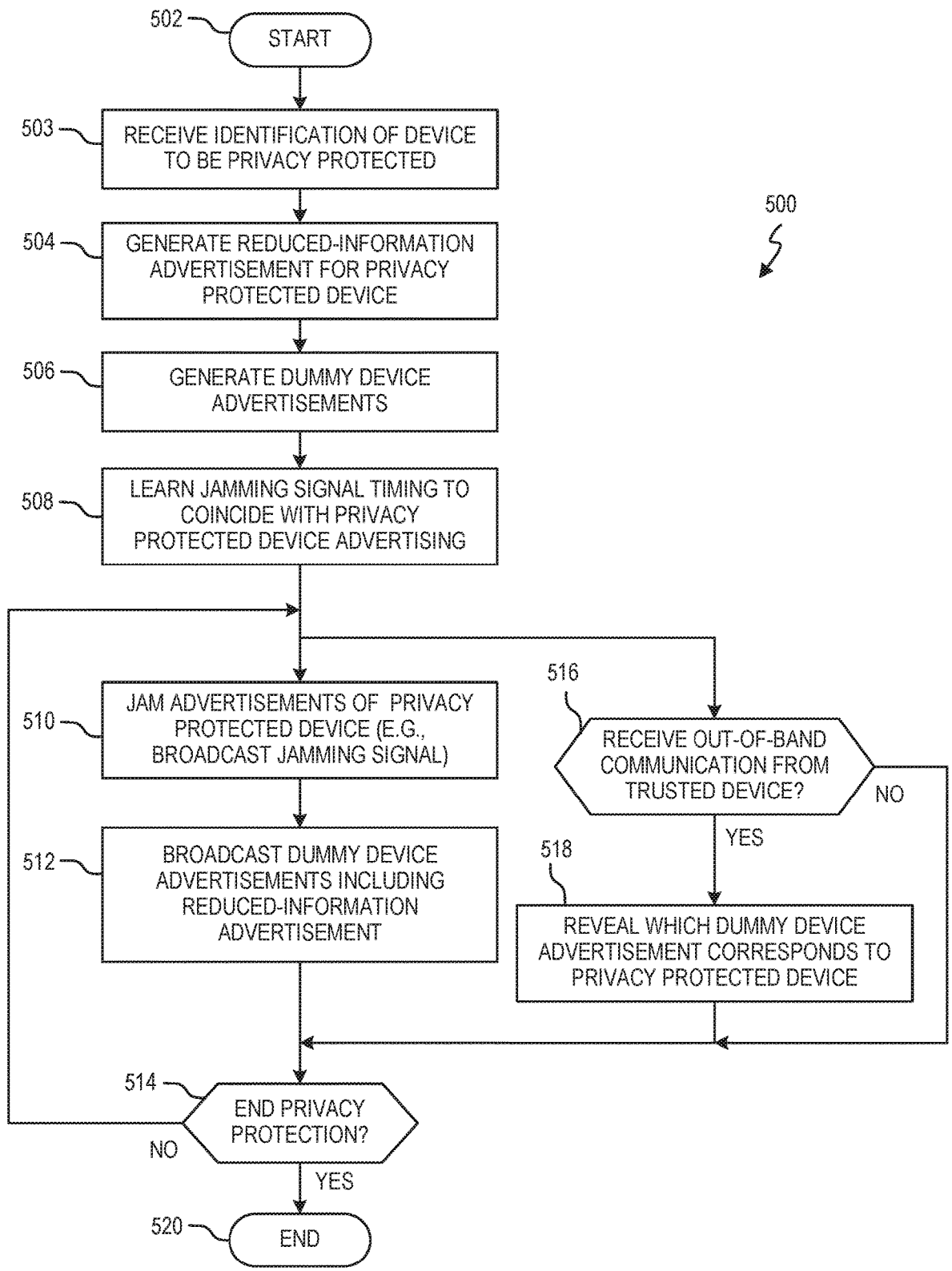
FIG. 5 is a flowchart of an example method for protecting the privacy of a device, according to another implementation.

FIG. 5 is a flowchart of an example method 500 for protecting the privacy of a device, according to another implementation. As with method 400, method 500 may be implemented in the form of executable instructions stored on a machine readable medium and executed by a processing resource and/or in the form of electronic circuitry. Method 500 is described below as being performed by a gateway device, such as the gateway 120 of FIG. 1. At least some portions of method 500 also may be performed by apparatuses 200 or 300 (or gateway 500 or 600 described below). In some implementations of the present disclosure, one or more blocks of method 500 may be executed substantially concurrently or in a different order than shown in FIG. 5. Some of the blocks of method 500 may, at times, be ongoing and/or may repeat. In some implementations of the present disclosure, method 500 may include more or fewer blocks than are shown in FIG. 5.

The method 500 begins at block 502, and continues to block 503, where the gateway device may receive configuration data from a user identifying a device that is to be privacy protected. For example, the gateway device may provide a list of detected devices, and the user may select from the list (via an interface of the gateway device) a device to receive privacy protection.

At block 504, the gateway device may observe an original (i.e., not jammed) advertisement broadcasted by a privacy protected device and generate a reduced-information advertisement by modifying the original advertisement of the privacy protected device to remove name information and maintain a device address of the privacy protected device. The reduced-information advertisement may also maintain a device type from the original advertisement, or other non-sensitive information. In some implementations, generating the reduced-information advertisement from the original advertisement includes zeroing out payload fields of the original advertisement that carry sensitive information (e.g., user identification, device name, device brand, sensor data).

At block 506, the gateway device generates dummy device advertisements. The dummy device advertisements may include an advertisement for a dummy device in a different device class than the privacy protected device, an advertisement for a dummy device within the same device class as the privacy protected device, or a combination thereof.

At block 508, the gateway device learns a timing to broadcast a jamming signal to coincide with advertising by the privacy protected device. The timing may be described in terms of an advertisement interval and a jamming duration. The advertisement interval controls an interval between broadcast of consecutive jamming signals and the jamming duration controls a duration of the jamming signal.

In some implementations, the learning at block 508 includes observing a plurality of advertisements broadcasted by the privacy protected device and calculating time intervals between successive advertisements of the plurality of advertisements. The gateway device may then set the advertisement interval to be a minimum interval from among the calculated time intervals. The gateway device may also calculate the jamming duration from a distribution of arithmetic differences resulting from subtraction of the advertisement interval from the calculated time intervals. In some implementations, the jamming duration may be a percentile-rank of the distribution.

In some implementations, blocks 504, 506, 508 may be deemed to occur during a learning period. After block 508, method 500 may proceed in parallel, in some implementations, along a first path that includes blocks 510, 512 and a second path that includes blocks 516, 518. In some implementations, the first path and the second path may proceed asynchronously. The paths will be described in turn.

At block 510, the gateway device jams advertisements of a privacy protected device. The jamming may include broadcasting a jamming signal on a wireless advertising channel at a timing to coincide with advertising by the privacy protected device, using the advertisement interval and the jamming duration learned at block 508.

At block 512, the gateway device broadcasts dummy device advertisements. More particularly, the gateway device broadcasts the reduced-information advertisement generated at block 504 and the dummy device advertisements generated at block 506. After block 512, the method 500 proceeds to block 514, but before describing block 514, blocks 516 and 518 will first be described.

At block 516, the gateway device determines whether an out-of-band communication from a trusted device has been received. More particularly, the out-of-band communication may be a request by the trusted device to connect to the privacy protected device. Additionally, the trusted device may authenticate itself to the gateway device as part of the out-of-band communication (e.g., via password, certificate, etc.). If no out-of-band communication has been received ("NO" at block 516), the method 500 proceeds to block 514. If an out-of-band communication has been received ("YES" at block 516), the method proceeds to block 518, where the gateway device reveals over an out-of-band communication link, which of the dummy device advertisements corresponds to the privacy protected device. After block 518, the method proceeds to block 514.

At block 514, the gateway device may determine whether to continue privacy protection for the privacy protected device. If privacy protection is to continue ("NO" at block 514), the gateway device proceeds back to block 510 and/or block 516. If privacy protection is to end ("YES" at block 514), the gateway device proceeds to block 520 and the method 500 ends. In some implementations, some example cases for ending privacy protection include a user configuring the gateway device to cease privacy protection or the privacy protected device exiting a transmission range of the gateway device.

Figure 6:
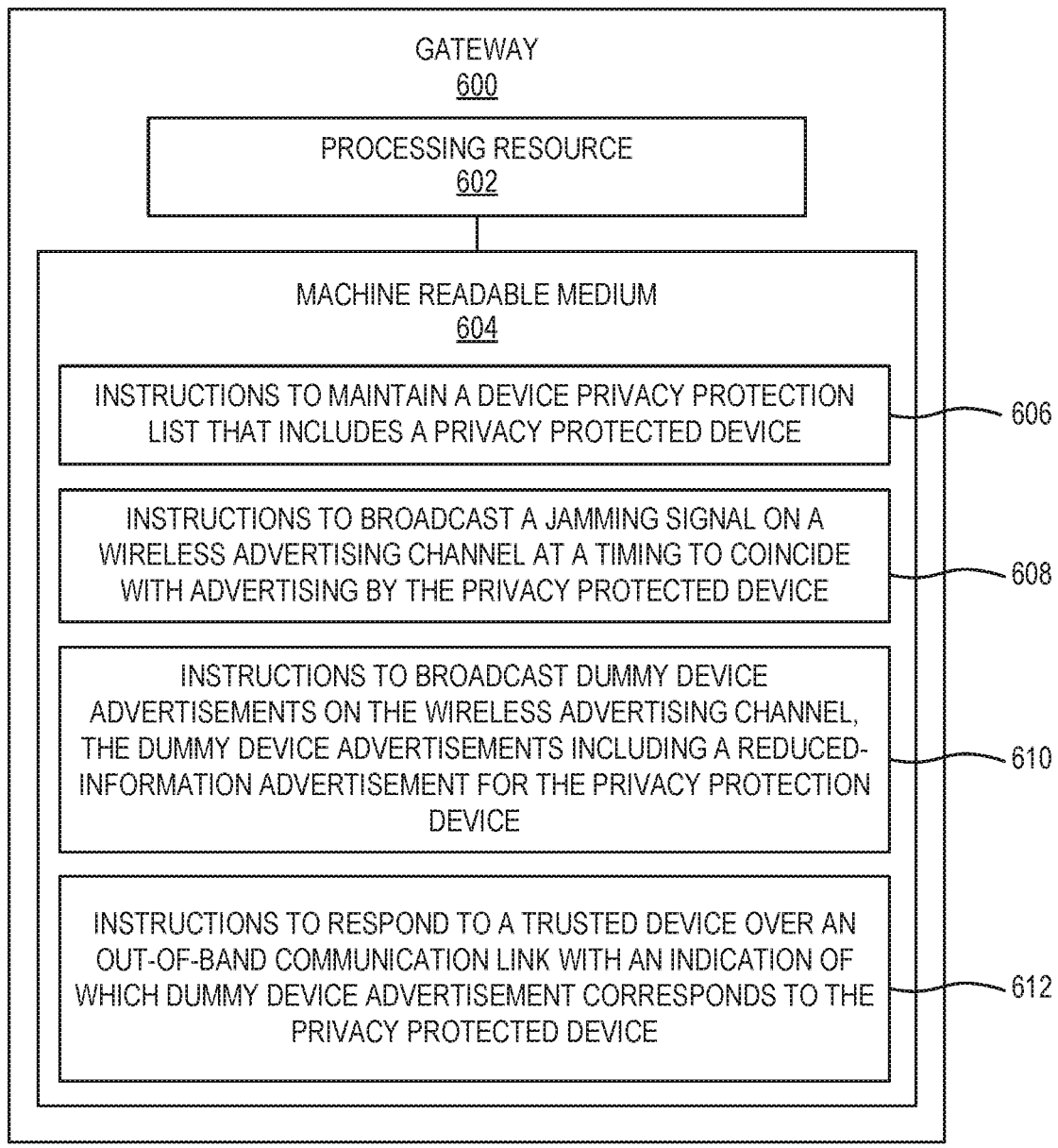
FIG. 6 is a block diagram of a gateway that includes a non-transitory, machine readable medium encoded with example instructions to broadcast a jamming signal and broadcast dummy device advertisements, according to an implementation.

FIG. 6 is a block diagram depicting an example gateway 600 that includes a processing resource 602 coupled to a non-transitory machine readable medium 604 storing (or encoded with) instructions 606, 608, 610, 612. The gateway 600 may form part of the gateway 120 described above.

In some implementations, the processing resource 602 may be a microcontroller, a microprocessor, CPU core(s), an ASIC, an FPGA, and/or other hardware device suitable for retrieval and/or execution of instructions stored on the machine readable medium 604. Additionally or alternatively, the processing resource 602 may include one or more hardware devices, including electronic circuitry, for implementing functionality described herein.

The machine readable medium 604 may be any medium suitable for storing executable instructions, such as RAM, ROM, EEPROM, flash memory, a hard disk drive, an optical disc, or the like. In some example implementations, the machine readable medium 604 may be a tangible, non-transitory medium. The machine readable medium 604 may be disposed within the gateway 600, as shown in FIG. 6, in which case the executable instructions may be deemed installed or embedded on the gateway 600. Alternatively, the machine readable medium 604 may be a portable (e.g., external) storage medium, and may be part of an installation package.

As described further herein below, the machine readable medium 604 may be encoded with a set of executable instructions 606, 608, 610, 612. It should be understood that part or all of the executable instructions and/or electronic circuits included within one box may, in alternate implementations, be included in a different box shown in the figures or in a different box not shown.

Instructions 608, when executed, cause the processing resource 602 to maintain a device privacy protection list that includes a privacy protected device. Instructions 610, when executed, cause the processing resource 602 to broadcast a jamming signal on a wireless advertising channel at a timing to coincide with advertising by the privacy protected device. Instructions 612, when executed, cause the processing resource 602 to broadcast dummy device advertisements on the wireless advertising channel, the dummy device advertisements including a reduced-information advertisement for the privacy protection device. Instructions 614, when executed, cause the processing resource 602 to respond to a trusted device over an out-of-band communication link with an indication of which dummy device advertisement corresponds to the privacy protected device.

Figure 7:
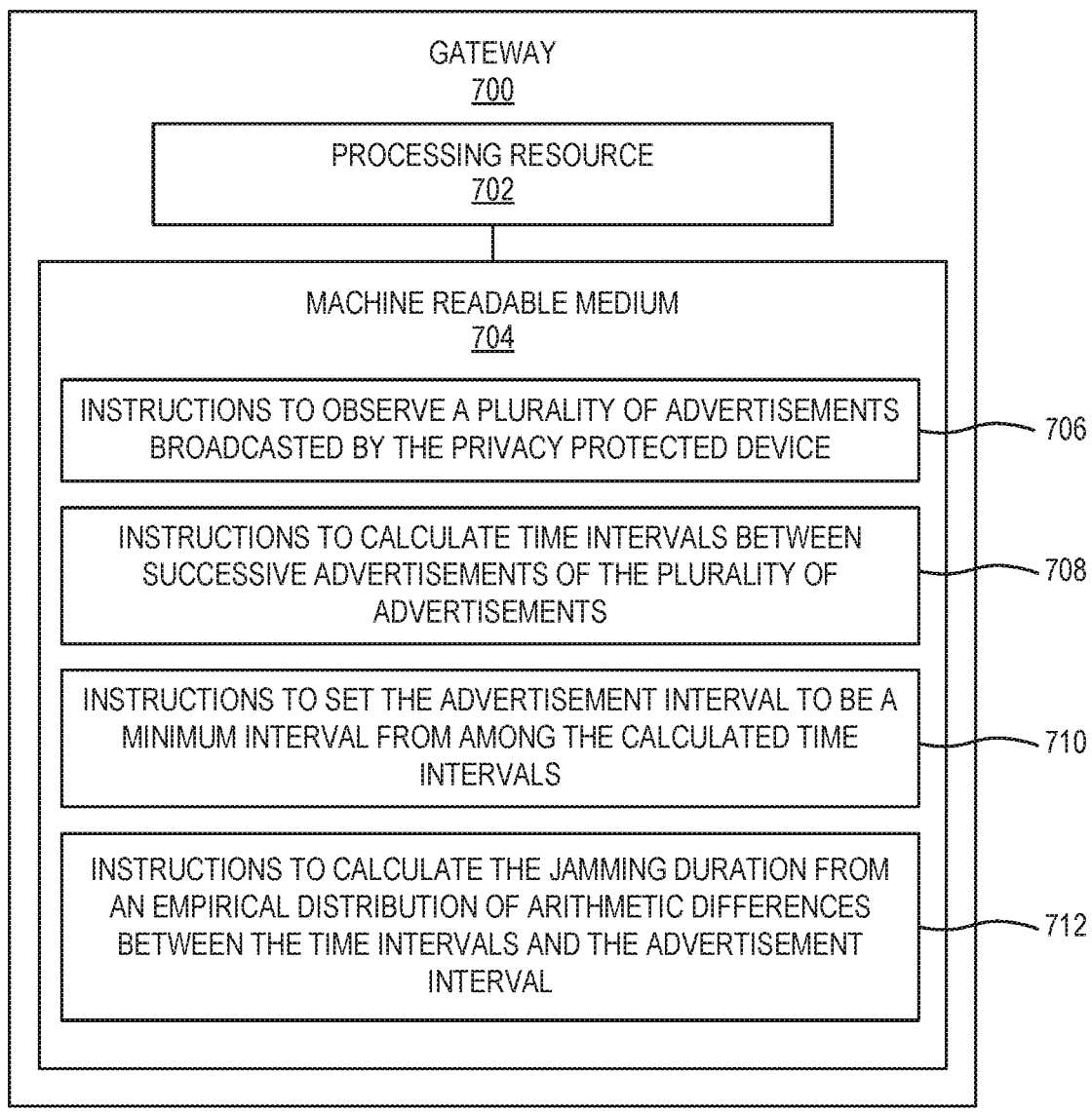
FIG. 7 is a block diagram of a gateway that includes a non-transitory, machine readable medium encoded with example instructions to set an advertisement interval and calculate a jamming duration, according to an implementation.

FIG. 7 is a block diagram depicting an example gateway 700 that includes a processing resource 702 coupled to a non-transitory machine readable medium 704 storing (or encoded with) instructions 706, 708, 710, 712. The processing resource 702 and the non-transitory machine readable medium 704 may be analogous in many respects to the processing resource 602 and the non-transitory machine readable medium 604, respectively. The gateway 700 may form part of the gateway 120 described above.

Instructions 706, when executed, cause the processing resource 702 to observe a plurality of advertisements broadcasted by a privacy protected device. Instructions 708, when executed, cause the processing resource 702 to calculate time intervals between successive advertisements of the plurality of advertisements. Instructions 710, when executed, cause the processing resource 702 to set an advertisement interval to be a minimum interval from among the calculated time intervals. Instructions 712, when executed, cause the processing resource 702 to calculate a jamming duration from an empirical distribution of arithmetic differences between the time intervals and the advertisement interval. The timing for broadcast of a jamming signal by e.g., instructions 610 described above may be based on the advertisement interval and the jamming duration, with the advertisement interval controlling an interval between broadcast of consecutive jamming signals and the jamming duration controlling a duration of the jamming signal.

Figure 8:
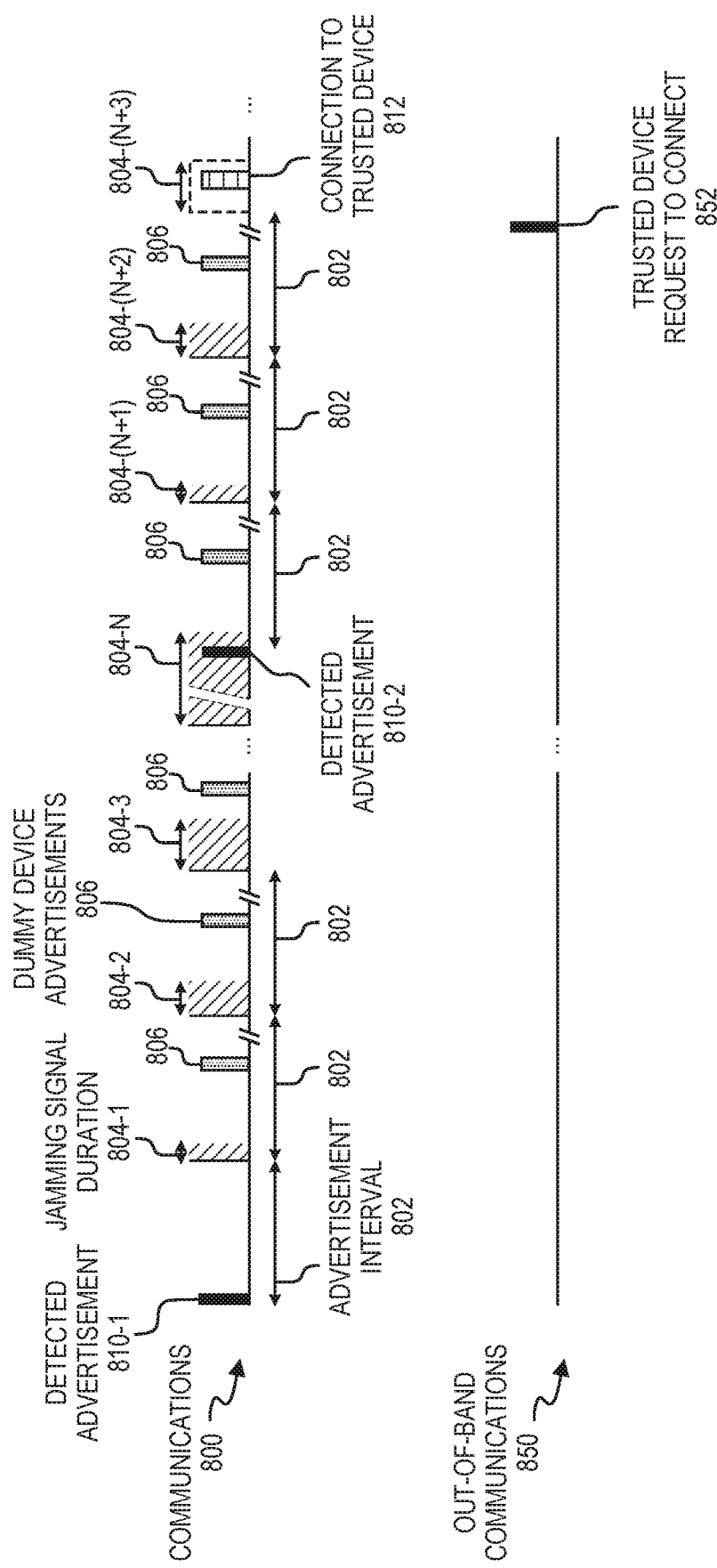
FIG. 8 depicts an example timing sequence of advertisement jamming and dummy device advertisements.

FIG. 8 depicts an example timing sequence of broadcasts 800, including advertisement jamming and dummy device advertisements. For example, jamming signals and dummy device advertisements may be described below as being broadcast by a gateway, such as the gateway 120 of FIG. 1, but various other devices may perform broadcasting as well, such as, for example, the apparatuses 200 or 300 or the gateways 600 or 700. The timing sequence shown may be useful for jamming a privacy protected device that operates in accordance with a protocol, such as BLE, that broadcasts advertisements at a fixed interval plus a random delay (e.g., 0 to 10 milliseconds, under BLE). Accordingly, in some examples, the gateway and privacy protected device may operate a same or compatible communications technology, such as BLE.

A gateway (e.g., similar to 120) may first detect an advertisement 810-1 broadcasted by a privacy protected device (e.g., similar to 116), which is deemed a reference point. The gateway then waits an advertisement interval 802 from the reference point. For example, the advertisement interval 802 may be learned by the gateway in a manner analogous to that described above with respect to the advertisement jammer 302, block 508 of method 500, or instructions 706, 708, 710.

After waiting the advertisement interval 802, the gateway broadcasts a first jamming signal after the reference point (810-1) for a duration 804-1. The duration for the first jamming signal is a base duration that may be a default value (e.g., a maximum random delay value associated with the communication protocol of the privacy protected device, such as 10 milliseconds for BLE) or may be a duration learned by the gateway in a manner analogous to that described above with respect to advertisement jammer 302, block 508 of method 500, or instructions 712. Because the gateway may not know ahead of time when the privacy protected device will broadcast its advertisement owing to the random delay, the jamming signal may be broadcasted continuously for the base duration to account for cover most or all of the random delay in privacy protected device advertising.

The gateway then waits for another advertisement interval 802 (e.g., timed from the start of the first jamming signal, having duration 804-1) before broadcasting a second jamming signal after the reference point (810-1), the second jamming signal having a duration 804-2. Meanwhile, as the gateway waits between jamming signals, the gateway broadcasts the dummy device advertisements 806, which includes a reduced-information advertisement for the privacy protected device hidden among advertisements for dummy devices.

The uncertainty in random delay and thus in the actual timing of the privacy protected device advertising compounds with each successive advertisement interval. Accordingly, jamming duration 804-2 is longer than the duration 804-1 in order to provide jamming in view of that increased uncertainty. For example, the duration 804-2 may be the proceeding duration 804-1 plus the base duration. Similarly, a third jamming signal has a duration 804-3 that may be the duration 804-2 plus the base duration.

Occasionally, the gateway may detect advertisements broadcasted by the privacy protected device. For example, in FIG. 8, the gateway may detect advertisement 810-2 occurring during the N-th jamming signal after the detected advertisement 810-1. The advertisement 810-2 may occur during a jamming duration (e.g., 804-N), in which case the advertisement 810-2 may be corrupted due to the jamming but still attributable to the privacy protected device by virtue of contextual information. In some cases, the advertisement 810-2 may be outside a jamming duration.

The gateway may deem the newly detected advertisement 810-2 as a new reference point. For example, the gateway may wait an advertisement interval 802 from the new reference point (i.e., detected advertisement 810-2) and then broadcast a jamming signal with duration 804-(N+1), which may be the base duration. The second jamming signal after the new reference point (810-2) may have a duration 804-(N+2) that is the duration 804-(N+1) plus the base duration, and so on.

A trusted device (e.g., similar to device 160) may communicate with the gateway via an out-of-band communications link. For example, out-of-band communications 850 may be performed over Wi-Fi while communications 800 are performed over BLE. In response to a request 852 from the trusted device to connect to the privacy protected device, the gateway may temporarily stop jamming (e.g., represented by the dashed box for the jamming duration 804-(N+3)) and allow connection 812 via BLE between the privacy protected device and the trusted device. The temporary pause in jamming may be scheduled by the gateway, and may not necessarily happen in the next instance of jamming immediately following the request 852.

In view of the foregoing description, it can be appreciated that a gateway device (e.g., a networking access point, a smartphone, other computing device) may protect the privacy of a user and a user's device, such as an Internet-of-Things devices. More particularly, such privacy protection may be achieved without modifying the underlying communications technology or protocol of the device (e.g., BLE). Additionally, privacy protection may be provided irrespective of the device type or class (i.e., privacy protection is device agnostic). Also, the gateway device may provide access control functionality by virtue of revealing which dummy device advertisement corresponds to the privacy protected device just to trusted devices over an out-of-band communications link.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A non-transitory machine readable medium storing instructions executable by a processing resource of a gateway device, the non-transitory machine readable medium comprising:
    instructions to maintain a device privacy protection list that includes a privacy protected device;
    instructions to broadcast a jamming signal on a wireless advertising channel at a timing to coincide with advertising by the privacy protected device; and
    instructions to broadcast dummy device advertisements on the wireless advertising channel, the dummy device advertisements including a reduced-information advertisement for the privacy protection device.

2. The non-transitory machine readable medium of claim 1, further comprising:
    instructions to observe a plurality of advertisements broadcasted by the privacy protected device;
    instructions to calculate time intervals between successive advertisements of the plurality of advertisements;
    instructions to set an advertisement interval to be a minimum interval from among the calculated time intervals; and
    instructions to calculate a jamming duration from an empirical distribution of arithmetic differences between the time intervals and the advertisement interval,
    wherein the timing is based on the advertisement interval and the jamming duration, the advertisement interval controlling an interval between broadcast of consecutive jamming signals and the jamming duration controlling a duration of the jamming signal.

3. The non-transitory machine readable medium of claim 1, further comprising:
    instructions to respond to a trusted device over an out-of-band communication link with an indication of which dummy device advertisement corresponds to the privacy protected device.

4. The non-transitory machine readable medium of claim 1, further comprising:
    instructions to generate the reduced-information advertisement by modifying an original advertisement of the privacy protected device to remove name information and to maintain a device address.

5. The non-transitory machine readable medium of claim 1, further comprising:
    instructions to generate the dummy device advertisements including an advertisement for a dummy device in a different device class than the privacy protected device.

6. The non-transitory machine readable medium of claim 1, further comprising:
    instructions to generate the dummy device advertisements including an advertisement for a dummy device within a same device class as the privacy protected device.

7. The non-transitory machine readable medium of claim 1, wherein the advertising of the privacy protected device and the dummy device advertisements are compatible with a Bluetooth Low Energy protocol.

8. A gateway device comprising:
a processing resource; and
a non-transitory machine readable medium storing instructions that, when executed, cause the processing resource to:
maintain a device privacy protection list that includes a privacy protected device;
broadcast a jamming signal on a wireless advertising channel at a timing to coincide with advertising by the privacy protected device; and
broadcast dummy device advertisements on the wireless advertising channel, the dummy device advertisements including a reduced-information advertisement for the privacy protection device.

9. The gateway device of claim 8, wherein the non-transitory machine readable medium stores instructions that, when executed, cause the processing resource to respond to a trusted device over an out-of-band communication link with an indication of which of the dummy device advertisement corresponds to the privacy protected device.

10. The gateway device of claim 8, wherein the non-transitory machine readable medium stores instructions that, when executed, cause the processing resource to generate the reduced-information advertisement by modifying an original advertisement of the privacy protected device to remove name information and to maintain a device address.

11. The gateway device of claim 8, wherein the non-transitory machine readable medium stores instructions that, when executed, cause the processing resource to generate the dummy device advertisements including an advertisement for a dummy device in a different device class than the privacy protected device.

12. The gateway device of claim 8, wherein the non-transitory machine readable medium stores instructions that, when executed, cause the processing resource to generate the dummy device advertisements including an advertisement for a dummy device within a same device class as the privacy protected device.

13. The gateway device of claim 8, wherein the non-transitory machine readable medium stores instructions for learning the timing that are executable by the processing resource, the instructions for learning the timing including:
instructions to observe a plurality of advertisements broadcasted by the privacy protected device,
instructions to calculate time intervals between successive advertisements of the plurality of advertisements,
instructions to set an advertisement interval of the timing to be a minimum interval from among calculated time intervals, and
instructions to calculate a jamming duration from a distribution of arithmetic differences between the time intervals and the advertisement interval, and
wherein the timing by which the jamming signal is broadcast is based on the advertisement interval and the jamming duration, the advertisement interval controlling an interval between broadcast of consecutive jamming signals and the jamming duration controlling a duration of the jamming signal.

14. The gateway device of claim 8, wherein the advertising of the privacy protected device and the dummy device advertisements are compatible with a Bluetooth Low Energy protocol.

15. The gateway device of claim 8, wherein the dummy device advertisements and the jamming signal are broadcast at different times.

16. A method comprising:
maintaining, by a gateway device, a device privacy protection list that includes a privacy protected device;
broadcasting, by the gateway device, a jamming signal on a wireless advertising channel at a timing to coincide with advertising by the privacy protected device; and
broadcasting, by the gateway device, dummy device advertisements on the wireless advertising channel, the dummy device advertisements including a reduced-information advertisement for the privacy protection device.

17. The method of claim 16, further comprising responding by the gateway device to a trusted device over an out-of-band communication link with an indication of which of the dummy device advertisement corresponds to the privacy protected device.

18. The method of claim 16, further comprising generating the reduced-information advertisement by modifying an original advertisement of the privacy protected device to remove name information and to maintain a device address.

19. The method of claim 16, further comprising generating the dummy device advertisements to include an advertisement for a dummy device in a different device class than the privacy protected device or an advertisement for a dummy device within the same device class as the privacy protected device.

20. The method of claim 16, further comprising:
observing a plurality of advertisements broadcasted by the privacy protected device;
calculating time intervals between successive advertisements of the plurality of advertisements;
setting the advertisement interval to be a minimum interval from among the calculated time intervals; and
calculating the jamming duration from a distribution of arithmetic differences between the time intervals and the advertisement interval,
wherein the timing by which the jamming signal is broadcast is based on the advertisement interval and the jamming duration, the advertisement interval controlling an interval between broadcast of consecutive jamming signals and the jamming duration controlling a duration of the jamming signal.

* * * * *